(12) United States Patent
Okamura et al.

(10) Patent No.: US 12,441,195 B2
(45) Date of Patent: Oct. 14, 2025

(54) CONTROL DEVICE FOR VEHICLE

(71) Applicant: MITSUBISHI JIDOSHA KOGYO KABUSHIKI KAISHA, Tokyo (JP)

(72) Inventors: Yutaro Okamura, Tokyo (JP); Wataru Tanooka, Tokyo (JP); Ryota Takahashi, Tokyo (JP); Naoki Takahashi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 18/023,854

(22) PCT Filed: Sep. 24, 2021

(86) PCT No.: PCT/JP2021/035002
§ 371 (c)(1),
(2) Date: Feb. 28, 2023

(87) PCT Pub. No.: WO2022/091659
PCT Pub. Date: May 5, 2022

(65) Prior Publication Data
US 2023/0322089 A1    Oct. 12, 2023

(30) Foreign Application Priority Data
Oct. 29, 2020    (JP) ................................ 2020-181097

(51) Int. Cl.
*B60L 3/10*    (2006.01)
*B60W 40/10*    (2012.01)

(52) U.S. Cl.
CPC ............. *B60L 3/102* (2013.01); *B60W 40/10* (2013.01); *B60L 2220/42* (2013.01);
(Continued)

(58) Field of Classification Search
CPC ................ B60L 3/102; B60L 2220/42; B60L 2240/423; B60L 2240/465; B60L 2260/44; B60W 40/10
(Continued)

(56) References Cited

U.S. PATENT DOCUMENTS 7,278,511 B1 * 10/2007 Gass .................... B62D 7/1509
                                                180/409
2007/0185623 A1 * 8/2007 Chen .................... B60W 30/04
                                                701/1
2019/0232799 A1 * 8/2019 Hirata ................ B60L 15/2036

FOREIGN PATENT DOCUMENTS

JP    2006-166572 A    6/2006
JP    2006-256367 A    9/2006
(Continued)

OTHER PUBLICATIONS

International Search Report (PCT/ISA/210) issued in PCT/JP2021/035002, dated Nov. 16, 2021.
(Continued)

*Primary Examiner* — Kawing Chan
(74) *Attorney, Agent, or Firm* — Birch, Stewart, Kolasch & Birch, LLP (57) ABSTRACT

A control device (10) for a vehicle (1) equipped with two electric motors (2) includes: a first calculation unit (11) that calculates a required torque value of each of left and right axles (4L, 4R); a second calculation unit (12) that calculates an equivalent moment of inertia of each of the left and right axles (4L, 4R); a third calculation unit (13) that calculates an estimated angular acceleration of each of left and right wheels (5) based on the two required torque values calculated by the first calculation unit (11) and the two equivalent moments of inertia calculated by the second calculation unit (12); and a determination unit (14) that compares actual angular accelerations of the left and right wheels (5) with the
(Continued)

estimated angular accelerations calculated by the third calculation unit (13) to perform off-ground determination for each of the left and right wheels (5).

3 Claims, 4 Drawing Sheets

(52) U.S. Cl.
CPC ... *B60L 2240/423* (2013.01); *B60L 2240/465* (2013.01); *B60L 2260/44* (2013.01)

(58) Field of Classification Search
USPC .......................................................... 318/52
See application file for complete search history.

(56) References Cited

FOREIGN PATENT DOCUMENTS

| | | | |
|---|---|---|---|
| JP | 2012-29473 A | | 2/2012 |
| JP | 2017200295 A | * | 11/2017 |

OTHER PUBLICATIONS

Written Opinion of the International Searching Authority (PCT/ISA/237) issued in PCT/JP2021/035002, dated Nov. 16, 2021.
Japanese Office Action dated Jun. 13, 2023 for Application No. 2022-558927 with an English translation.
International Preliminary Report on Patentability and English translation of the Written Opinion of the International Searching Authority for International Application No. PCT/JP2021/035002, dated May 2, 2023.
Extended European Search Report for European Application No. 21885778.7, dated Dec. 8, 2023.
Larminie, "Electric Vehicle Modelling," Electric Vehicle Technology Explained, Second Edition, Dec. 31, 2012, pp. 187-219, XP093104603.
Chinese Office Action and Search Report for Chinese Application No. 202180061979.1, dated Jun. 7, 2025, with English translation of the Office Action.

* cited by examiner

CONTROL DEVICE FOR VEHICLE

FIELD

The present disclosure relates to a control device for a vehicle equipped with two electric motors for driving left and right wheels, and more particularly, to a control device for determining that a wheel is off the ground.

BACKGROUND

Conventionally, a known control device that drives left and right wheels of a vehicle by an electric motor performs, when detecting slippage of the left and right wheels, a type of control that limits power outputted from the electric motor and another type of control that applies a brake force, so as to suppress the slippage (see Patent Literature 1). This technique gives priority so that the two types of control do not interfere with each other, and can allegedly improve the feeling of drive at the time when the occurred slippage is suppressed.

PRIOR ART LITERATURE

Patent Literature

[Patent Literature 1] Japanese Laid-open Patent Publication No. 2006-256367

SUMMARY

Technical Problems

However, the above Patent Literature 1 describes nothing about a threshold value αslip used for determination on whether or not the slippage has occurred, and uncertainty remains on whether the value is a fixed value or a variable value. In such determination, how to set the determination threshold is extremely important, and it is not an exaggeration to say that the accuracy of the determination depends on the setting of the determination threshold. This is not limited to the slippage determination, and can also be said as to the determination on whether or not a wheel is in an off-ground state meaning that the wheel is completely above a road surface.

The control device for a vehicle of the present disclosure has been devised in view of such problems, and an object thereof is to accurately determine the off-ground state of left and right wheels. The objects of the present disclosure are not limited to this object, and it is another object of the present disclosure to provide actions and effects which are derived from each configuration described in DESCRIPTION OF EMBODIMENT(S) to be described later, and which are not achieved by conventional techniques.

Solution to Problems (1) A control device for a vehicle disclosed herein is for the vehicle quipped with two electric motors for driving left and right wheels of the vehicle, and includes: a first calculation unit that calculates a required torque value of each of left and right axles of the vehicle; a second calculation unit that calculates an equivalent moment of inertia of each of the left and right axles; a third calculation unit that calculates an estimated angular acceleration of each of the left and right wheels based on the two required torque values calculated by the first calculation unit and the two equivalent moments of inertia calculated by the second calculation unit; and a determination unit that compares actual angular accelerations of the left and right wheels with the estimated angular accelerations calculated by the third calculation unit to perform off-ground determination for each of the left and right wheels.

(2) Preferably, the vehicle is further equipped with a power distribution mechanism that includes a reduction mechanism for reducing rotational speeds of the two electric motors and that distributes torque to each of the left and right wheels while amplifying a torque difference between the two electric motors, and the second calculation unit uses, when calculating the estimated angular accelerations, a reduction ratio and a torque difference amplification factor of the power distribution mechanism.

(3) Preferably, each of the equivalent moments of inertia is calculated based on inertia of the two electric motors, inertia of the left and right wheels, and a ratio of angular accelerations of the left and right wheels.

Advantageous Effects

According to the disclosed control device for a vehicle, since the estimated angular accelerations serving as thresholds to be used for the off-ground determination are calculated based on the required torque values and the equivalent moments of inertia of the axles, the off-ground state of the left and right wheels can be accurately determined.

BRIEF DESCRIPTION OF THE DRAWINGS

FIG. 3($a$) illustrates a torque balance in an on-ground state of the vehicle, and FIG. 3($b$) illustrates a torque balance in an off-ground state.

DESCRIPTION OF EMBODIMENT(S)

With reference to drawings, description will now be made in relation to a control device for a vehicle as an embodiment. The following embodiment is merely an example, and is not intended to exclude the application of various modifications and techniques not explicitly described in the following embodiment. Each configuration of the present embodiment can be variously modified and implemented without departing from the gist thereof. Also, it can be selected as necessary, or it can be combined as appropriate.

1. Configuration

Figure 1:
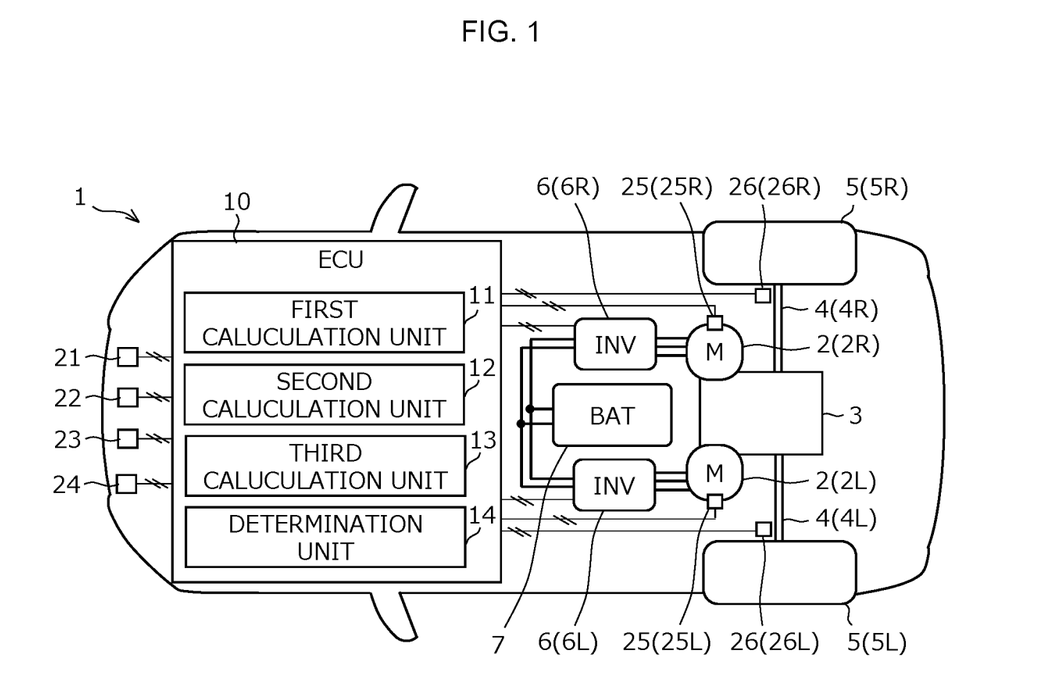
FIG. 1 is a schematic diagram of a vehicle to which a control device according to an embodiment is applied.

FIG. 1 is a schematic diagram of a vehicle 1 including a control device 10 according to the present embodiment. The vehicle 1 is equipped with two electric motors 2 for driving left and right wheels 5 (here, rear wheels). In the following description, the letter "L" or "R" added at the end of a reference numeral represents an arrangement position (being on the left side or the right side of the vehicle 1) of the element according to the reference numeral. For example, among the left and right wheels 5, 5L represents the one (i.e., left wheel) located on the left side of the vehicle, and 5R represents the other one (i.e., right wheel) located on the right side.

The two electric motors 2 have a function of driving at least front wheels or rear wheels of the vehicle 1, and may have a function of driving all four wheels. Hereinafter, among the two electric motors 2, the one disposed on the left side is also referred to as a left electric motor 2L (left motor), and the other one disposed on the right side is also referred to as a right electric motor 2R (right motor). The left electric motor 2L and the right electric motor 2R operate independently from each other, and can individually output driving forces that differ from each other in magnitudes. The left electric motor 2L and the right electric motor 2R of the present embodiment have the same rated power, and are provided in pairs.

Figure 2:
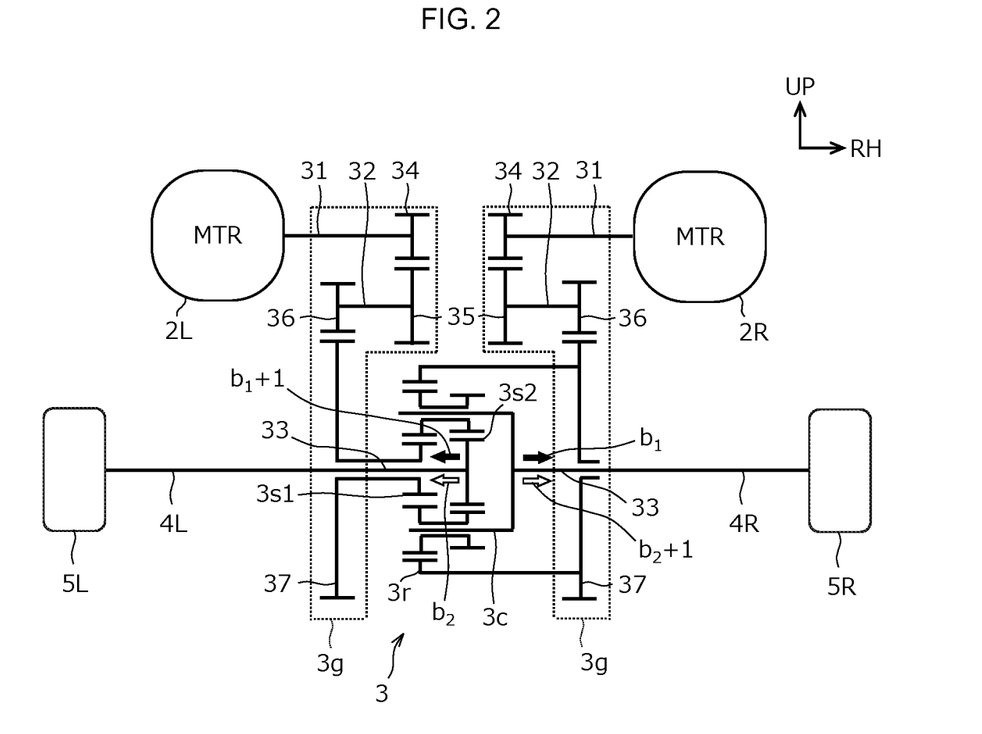
FIG. 2 is a skeleton diagram for explaining a configuration of a power distribution mechanism of the vehicle illustrated in FIG. 1.

The vehicle 1 of the present embodiment includes a power distribution mechanism 3 that distributes torque to each of the left and right wheels 5 while amplifying a torque difference between the pair of electric motors 2. As illustrated in FIG. 2, the power distribution mechanism 3 includes a pair of reduction mechanisms 3g (gear trains surrounded by broken lines in FIG. 2) for reducing a rotational speed of each electric motor 2. The reduction mechanisms 3g are mechanisms that increase torque by decelerating torque (driving forces) outputted from the electric motors 2. The reduction ratios G of the reduction mechanisms 3g are appropriately set in accordance with output characteristics and performance of the electric motors 2. In the present embodiment, the reduction ratios G of the left and right reduction mechanisms 3g are equal to each other. Incidentally, when the torque performance of the electric motors 2 is sufficiently high, the reduction mechanisms 3g may be omitted. The pair of electric motors 2 is connected to the power distribution mechanism 3, and the torque is amplified as the rotational speeds of the electric motors 2 are reduced and then is transmitted (distributed) to each of the left and right wheels 5.

As illustrated in FIGS. 1 and 2, the power distribution mechanism 3 is a differential mechanism that has a yaw control function (AYC function), and is interposed between an axle 4 (left axle 4L) connected to the left wheel 5L and an axle 4 (right axle 4R) connected to the right wheel 5R. The yaw control function is a function of adjusting a yaw moment by positively controlling an allocation ratio of the driving forces (driving torque) of the left and right wheels 5 to stabilize the attitude of the vehicle 1. The power distribution mechanism 3 includes therein a planetary gear mechanism, a differential gear mechanism, and the like. It should be noted that a vehicle drive device that includes the pair of electric motors 2 and the power distribution mechanism 3 is also referred to as a DM-AYC (Dual-Motor Active Yaw Control) device.

Each of the electric motors 2L and 2R is electrically connected to a battery 7 via an inverter 6 (6L, 6R). The inverter 6 is a converter (DC-AC inverter) that converts power (DC power) of a DC circuit on the battery 7 side into power (AC power) of an AC circuit on the electric motor 2 side or vice versa. The battery 7 is, for example, a lithium-ion secondary battery or a nickel-hydrogen secondary battery, and is a secondary battery capable of supplying a high voltage DC current of several hundred volts. During power running of the electric motors 2, the DC power is converted into the AC power by the inverters 6 and is supplied to the electric motors 2. During power generation of the electric motors 2, the generated electric power is converted into the DC power by the inverters 6 and is charged into the battery 7. Operational states of the inverters 6 are controlled by the control device 10.

The control device 10 is one of electronic control devices (ECUs, Electronic Control Units) mounted on the vehicle 1, and includes therein a processor (central processing unit), a memory (main memory), a storage device (storage), an interface device, and the like, which are not illustrated but communicably connected to each other via an internal bus. The contents of determination and control to be performed by the control device 10 are recorded and stored in the memory as firmware or application programs, and when the programs are executed, the contents of the programs are expanded in a memory space and executed by the processor.

To the control device 10, as illustrated in FIG. 1, an accelerator position sensor 21, a brake sensor 22, a steering angle sensor 23, a vehicle speed sensor 24, motor rotational speed sensors 25, and wheel speed sensors 26 are connected. The accelerator position sensor 21 is a sensor that detects a depression amount (accelerator position) of an accelerator pedal and/or a depression speed thereof. The brake sensor 22 is a sensor that detects a depression amount (brake pedal stroke) of a brake pedal and/or a depression speed thereof. The steering angle sensor 23 is a sensor that detects steering angles of the left and right wheels 5 (actual steering angles or a steering angle of a steering wheel), and the vehicle speed sensor 24 is a sensor that detects a vehicle speed (traveling speed).

The motor rotational speed sensors 25 are sensors that detect rotational angular speeds (i.e., motor angular speeds $\Omega_{Lm}$ and $\Omega_{Rm}$) of the electric motors 2, and are individually provided one for each of the electric motors 2. Similarly, the wheel speed sensors 26 are sensors that detect rotational angular speeds (wheel angular speeds $\Omega_{Lds}$ and $\Omega_{Rds}$) of the left and right wheels 5 (or the axles 4), and are individually provided one in each vicinity of the left wheel 5L and the right wheel 5R. The control device 10 controls the operational states of the inverters 6 based on each piece of information detected by the sensors 21 to 26, and thereby controls the output of the pair of electric motors 2.

The control device 10 uses actual values (actual angular accelerations) and estimated values (estimated angular accelerations) of the angular accelerations of the left and right wheels 5 to perform off-ground determination for each of the left and right wheels 5. The off-ground determination is determination on whether or not driving wheels are above a road surface (spinning in the air), and is performed for each of the left and right wheels 5. The determination of "YES" in the off-ground determination may cause execution of control for overcoming the off-ground state, control that stops the vehicle 1, and the like. The determination of "NO" in the off-ground determination means that the left and right wheels 5 are both on the ground (normal). It should be noted that the off-ground determination is performed constantly (at a predetermined cycle) while the main power of the vehicle 1 is on (during Ready ON).

As illustrated in FIG. 1, inside the control device 10, there are provided a first calculation unit 11, a second calculation unit 12, a third calculation unit 13, and a determination unit 14. These elements are illustrated so as to expediently classify functions of the control device 10. These elements can each be described as an independent program, and can also be described as a composite program in which multiple elements are combined. The program corresponding to each element is stored in the memory or the storage device of the control device 10, and is executed by the processor.

Figure 3:
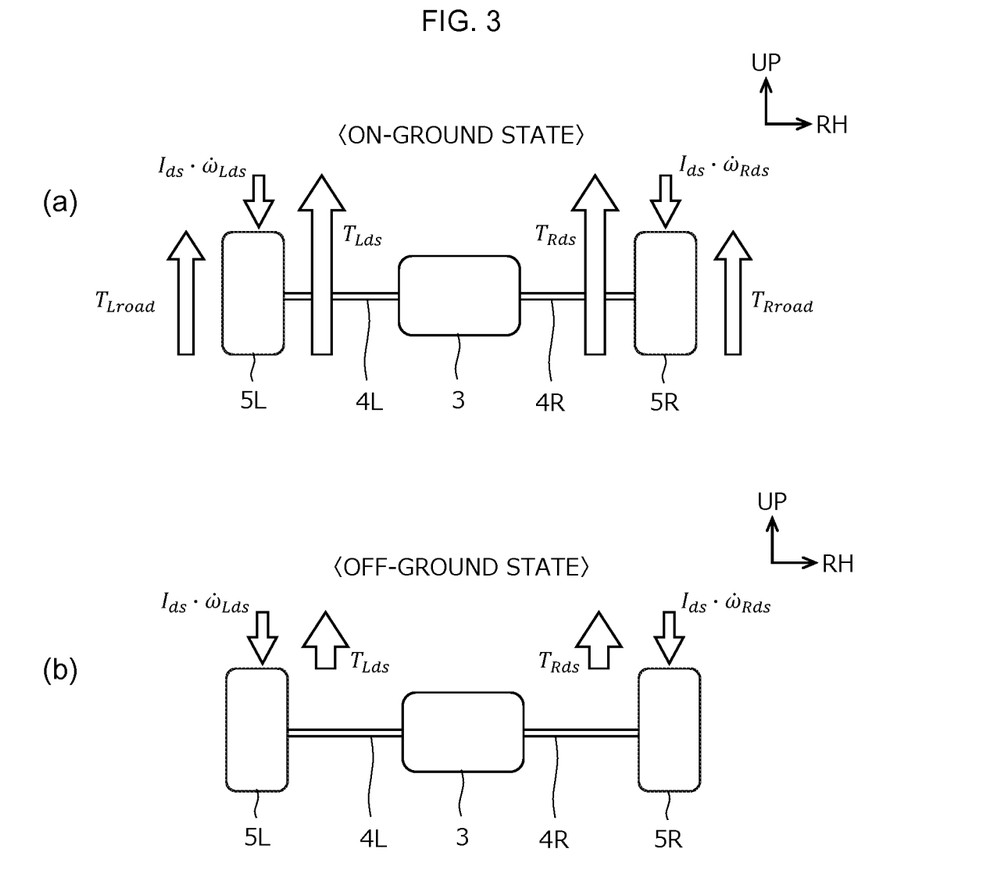

As illustrated in FIG. 3(a), when both of the left and right wheels 5 are on the ground, that is, when the left and right wheels 5 are in contact with the road surface, torque $T_{Lroad}$, $T_{Rroad}$ transmitted to the road surface is obtained by subtracting inertia torque of the left and right wheels 5 from the driving torque (that is, required torque values $T_{Lds}$ and $T_{Rds}$ of the left and right axles 4L and 4R) inputted to the left and right wheels 5. Accordingly, both of the following Equations 1 and 2 hold in an on-ground state.

[Formula 1]

$$T_{Lroad} = T_{Lds} - I_{Lds} \cdot \dot{\Omega}_{Lds} \quad \text{Equation 1}$$

$$T_{Rroad} = T_{Rds} - I_{Rds} \cdot \dot{\Omega}_{Rds} \quad \text{Equation 2}$$

where $T_{Lroad}$, $T_{Rroad}$: torque transmitted to road surface $T_{Lds}$, $T_{Rds}$: axle required torque $I_{Lds}$, $I_{Rds}$: equivalent moment of inertia of axle (inertia on axle)

$\dot{\Omega}$Lds, $\dot{\Omega}$Rds: wheel angular acceleration

On the other hand, as illustrated in FIG. 3(b), when either one of the left and right wheels 5 is off the ground, that is, when one of the left and right wheels 5 is spinning above the road surface, the torque $T_{Lroad}$, $T_{Rroad}$ transmitted to the road surface becomes 0. Thus, among the above Equation 1 (left wheel 5L) and Equation 2 (right wheel 5R), the left side of the equation of the wheel off the ground becomes 0, and therefore, Equation 3 or 4 below holds. Although FIG. 3(b) expediently illustrates a case in which both of the left and right wheels 5 are spinning, it should be noted that the off-ground determination determines the off-ground state of one of the left and right wheels 5.

$$\dot{\omega}_{Lds} = \frac{T_{Lds}}{I_{Lds}} \quad \text{Equation 3}$$

$$\dot{\omega}_{Rds} = \frac{T_{Rds}}{I_{Rds}} \quad \text{Equation 4}$$

As described above, when either one of the left and right wheels 5 is off the ground, the angular acceleration of the wheel off the ground comes to be equal to (or greater than) the wheel angular acceleration calculated by Equation 3 or Equation 4. Therefore, the off-ground determination is performed by comparing actual angular accelerations, which are time derivatives of actual wheel speeds $\Omega_{Lds}$ and $\Omega_{Rds}$ respectively detected by the left and right wheel speed sensors 26L and 26R, with the wheel angular accelerations (estimated angular accelerations) calculated by Equation 3 or Equation 4.

The first calculation unit 11 calculates each of the required torque value $T_{Lds}$ of the left axle 4L (left wheel 5L) and the required torque value $T_{Rds}$ of the right axle 4R (right wheel 5R). The first calculation unit 11 calculates the required torque values $T_{Lds}$ and $T_{Rds}$ of the left and right axles 4 individually from each other based on, for example, the accelerator position, the brake pedal stroke, the steering angle, the vehicle speed, and the like.

The second calculation unit 12 calculates each of the equivalent moment of inertia $I_{Lds}$ of the left axle 4L and the equivalent moment of inertia $I_{Rds}$ of the right axle 4R. The equivalent moment of inertia corresponds to inertia for each path from the left and right electric motors 2 to the left and right wheels 5. The second calculation unit 12 calculates the equivalent moments of inertia $I_{Lds}$ and $I_{Rds}$ of the left and right axles 4 individually from each other based on, for example, the time derivatives of the wheel speeds $\Omega_{Lds}$ and $\Omega_{Rds}$, motor inertia $I_m$, tire inertia $I_t$, the reduction ratios G, gear ratios $b_1$ and $b_2$, and the like.

The third calculation unit 13 calculates the estimated angular accelerations of the left and right wheels 5 based on the two required torque values $T_{Lds}$ and $T_{Rds}$ calculated by the first calculation unit 11 and the two equivalent moments of inertia $I_{Lds}$ and $I_{Rds}$ calculated by the second calculation unit 12. The estimated angular accelerations are determination thresholds to be used in the off-ground determination, and can be calculated from, for example, Equations 3 and 4 described above.

The determination unit 14 compares the actual angular accelerations of the left and right wheels 5 with the estimated angular accelerations calculated by the third calculation unit 13 to perform the off-ground determination for each of the left and right wheels 5. The determination unit 14 differentiates the actual wheel speeds $\Omega_{Lds}$ and $\Omega_{Rds}$ detected by the left and right wheel speed sensors 26L and 26R once, and if the obtained time derivatives (i.e., the actual angular accelerations) are equal to or greater than the estimated angular accelerations, determines that the wheels are off the ground, and if the actual angular accelerations are less than the estimated angular accelerations, determines that the wheels are on the ground.

Hereinafter, an example of the power distribution mechanism 3 will be described with reference to FIG. 2. The power distribution mechanism 3 illustrated in FIG. 2 includes: the pair of reduction mechanisms 3g in which the reduction ratios G are set; and a planetary gear mechanism that has a function of amplifying a torque difference at a predetermined amplification factor. The power distribution mechanism 3 is preferably disposed between the left and right electric motors 2L and 2R in a vehicle width direction.

The planetary gear mechanism is a double pinion planetary gear which includes a sun gear 3s1 and a ring gear 3r as input elements and a sun gear 3s2 and a carrier 3c as output elements. To the sun gear 3s1, torque is inputted from the left electric motor 2L, and to the ring gear 3r, torque is inputted from the right electric motor 2R. The input elements are provided so as to rotate integrally with idler gears 37, which will be described later, and the output elements are provided so as to rotate integrally with output shafts 33.

Each of the reduction mechanisms 3g is configured to reduce the rotational speed of the electric motor 2 in two stages by four gears 34, 35, 36, and 37 provided on three shafts 31, 32, and 33 arranged in parallel. Hereinafter, the three shafts are referred to as a motor shaft 31, a counter shaft 32, and the output shaft 33, in the order from an upstream side of a power transmission path from the electric motor 2 to the left and right wheels 5. Two sets of these shafts 31 to 33 are provided in the power distribution mechanism 3. The two motor shafts 31, the two counter shafts 32, and the two output shafts 33, which are located on left and right, are configured similarly (symmetrically). In addition, the reduction mechanisms 3g provided on these shafts 31 to 33 are configured similarly (symmetrically) on the left and right.

The motor shafts 31 are positioned coaxially with each rotating shaft of the left and right electric motors 2L and 2R, and each include a first fixed gear 34. The counter shafts 32 are each provided with a second fixed gear 35 meshing with the first fixed gear 34 and a third fixed gear 36 having a smaller diameter than that of the second fixed gear 35. The second fixed gears 35 having larger diameters are disposed on the inner side in the vehicle width direction from the third fixed gears 36 having smaller diameters. The output shafts 33 are each provided with the idler gear 37 meshing with the third fixed gear 36. The first fixed gear 34 and the second fixed gear 35 constitute a first-stage reduction gear train, and the third fixed gear 36 and the idler gear 37 constitute a second-stage reduction gear train. Incidentally, the sun gear 3s1 is connected to the idler gear 37 on the left side, and the ring gear 3r is connected to the idler gear 37 on the right side.

The reduction ratios G of the reduction mechanisms 3g can be expressed as ratios of the rotational angular speeds transmitted from the electric motors 2 to the reduction mechanisms 3g and the rotational angular speeds transmitted from the reduction mechanisms 3g to the left and right wheels 5 (or a ratio of the number of teeth of gears). Further, inside the power distribution mechanism 3, $b_1$ is assumed to be a reduction ratio of a path on which the driving force of the left electric motor 2L is transmitted to the right wheel 5R, and $b_2$ is assumed to be a reduction ratio of a path on which the driving force of the right electric motor 2R is transmitted to the left wheel 5L. In this case, Equations 1 and 2 can be expressed as following Equations 5 and 6.

[Formula 3]

$$T_{Lroad}=(b_1+1)(T_{Lm}-T_{Llm})-b_2(T_{Rm}-T_{Rlm})-I_t\dot{\Omega}_{Lds} \quad \text{Equation 5}$$

$$T_{Rroad}=(b_2+1)(T_{Rm}-T_{Rlm})-b_1(T_{Lm}-T_{Llm})-I_t\dot{\Omega}_{Rds} \quad \text{Equation 6}$$

where $T_{Lm}$, $T_{Rm}$: indicated torque of electric motor (motor indicated torque)

$T_{Llm}$, $T_{Rlm}$: inertial torque of electric motor (motor inertial torque)

$\dot{\Omega}_{Lm}$, $\dot{\Omega}_{Rm}$: angular acceleration of electric motor (motor angular acceleration)

$I_m$: inertia of electric motor (motor inertia)

$I_t$: inertia of wheel (tire inertia)

In addition, inertial torque $T_{Llm}$ and $T_{Rlm}$ of the left and right electric motors 2L and 2R can be expressed by following Equations 7 and 8, and the angular accelerations of the left and right electric motors 2L and 2R can be expressed by following Equations 9 and 10.

[Formula 4]

$$T_{Llm}=G^2 \cdot I_m \cdot \dot{\Omega}_{Lm} \quad \text{Equation 7}$$

$$T_{Rlm}=G^2 \cdot I_m \cdot \dot{\Omega}_{Rm} \quad \text{Equation 8}$$

$$\dot{\Omega}_{Lm}=\{(b_1+1)\cdot\dot{\Omega}_{Lds}-b_1\cdot\dot{\Omega}_{Rds}\} \quad \text{Equation 9}$$

$$\dot{\Omega}_{Rm}=\{(b_2+1)\cdot\dot{\Omega}_{Rds}-b_2\cdot\dot{\Omega}_{Lds}\} \quad \text{Equation 10}$$

By substituting each of Equations 7 to 10 for Equations 5 and 6, the torque $T_{Lroad}$ and $T_{Rroad}$ transmitted to the road surface can be expressed by following Equations 11 and 12.

[Formula 5]

$$T_{Lroad} = \{(b_1+1)T_{Lm} - b_2 T_{Rm}\} - \left[\{(b_1+1)^2 + b_2^2\}\cdot G^2 \cdot I_m - \{b_1(b_1+1) + b_2(b_2+1)\}\cdot G^2 \cdot I_m \cdot \frac{\dot{\omega}_{Rds}}{\dot{\omega}_{Lds}} + I_t\right]\cdot\dot{\omega}_{Lds} \quad \text{Equation 11}$$

$$T_{Rroad} = \{(b_2+1)T_{Rm} - b_1 T_{Lm}\} - \left[\{(b_2+1)^2 + b_1^2\}\cdot G^2 \cdot I_m - \{b_1(b_1+1) + b_2(b_2+1)\}\cdot G^2 \cdot I_m \cdot \frac{\dot{\omega}_{Lds}}{\dot{\omega}_{Rds}} + I_t\right]\cdot\dot{\omega}_{Rds} \quad \text{Equation 12}$$

In Equations 11 and 12, the first terms of the right sides are the required torque values $T_{Lds}$ and $T_{Rds}$ of the left and right axles 4, and the second terms of the right sides are the products of the equivalent moments of inertia $I_{Lds}$ and $I_{Rds}$ of the left and right axles 4 and the angular accelerations (the time derivatives of the wheel speeds $\Omega_{Lds}$ and $\Omega_{Rds}$) of the left and right wheels 5. That is, the equivalent moments of inertia $I_{Lds}$ and $I_{Rds}$ of the left and right axles 4 are calculated based on the inertia $I_m$ of the two electric motors 2, the inertia $I_t$ of the left and right wheels 5, and the ratio of the angular accelerations of the left and right wheels 5.

As described above, when either one of the left and right wheels 5 is off the ground, the torque $T_{Lroad}$ and $T_{Rroad}$ transmitted to the road surface becomes 0, so that by plugging 0 in the left sides of the above Equations 11 and 12 and solving them for the angular accelerations, the following Equations 13 and 14 can be derived. Namely, the estimated angular accelerations in this case can be expressed by Equations 13 and 14. Therefore, in the control device 10 for the vehicle 1 equipped with the power distribution mechanism 3 illustrated in FIG. 2, the third calculation unit 13 uses, when calculating the estimated angular accelerations, the reduction ratio G and the torque difference amplification factor of the power distribution mechanism 3.

Figure 4:
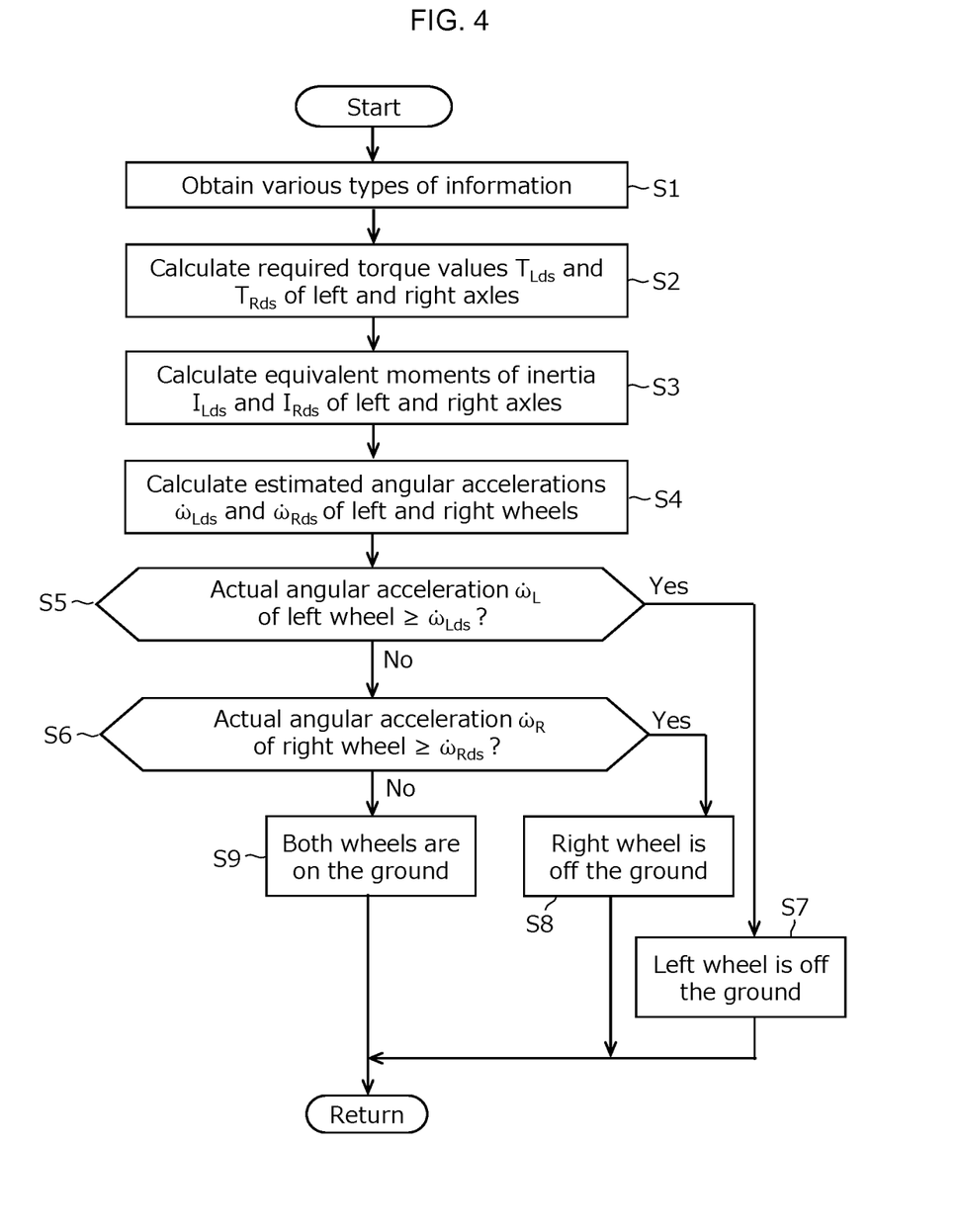
FIG. 4 is a flowchart for explaining a procedure of determination executed by the control device illustrated in FIG. 1.

[Formula 6]

$$\dot{\omega}_{Lds} = \frac{(\alpha G^2 I_m + I_t)T_{Lds} + \gamma G^2 I_m T_{Rds}}{(\alpha G^2 I_m + I_t)(\beta G^2 I_m + I_t) - \gamma^2 G^4 I_m^2} \quad \text{Equation 13}$$

$$\dot{\omega}_{Rds} = \frac{(\alpha G^2 I_m + I_t)T_{Rds} + \gamma G^2 I_m T_{Lds}}{(\alpha G^2 I_m + I_t)(\beta G^2 I_m + I_t) - \gamma^2 G^4 I_m^2} \quad \text{Equation 14}$$

where $\alpha = (b_1+1)^2 + b_2^2$ $\beta = (b_2+1)_2 + b_1^2$ $\gamma = b_1(b_1+1) + b_2(b_2+1)$ 2. Flowchart FIG. 4 is an example of a flowchart executed by the control device 10. This flowchart is repeatedly executed at a predetermined cycle, for example, from when the vehicle 1 turns to a Ready ON state until the vehicle 1 becomes Ready OFF.

In Step S1, the information detected by various sensors 21 to 26 is inputted to the control device 10. In Step S2, the first calculation unit 11 calculates the required torque values $T_{Lds}$ and $T_{Rds}$ of the left and right axles 4. In Step S3, the second calculation unit 12 calculates the equivalent moments of inertia $I_{Lds}$ and $I_{Rds}$ of the left and right axles 4. In subsequent Step S4, the third calculation unit 13 calculates the estimated angular accelerations of the left and right wheels 5.

In Step S5, the off-ground determination is performed for the left wheel 5L. That is, it is determined whether or not the actual angular acceleration of the left wheel 5L is equal to or greater than the estimated angular acceleration of the left wheel 5L calculated in Step S4. If this determination result is YES, the process proceeds to Step S7, where it is determined that the left wheel 5L is off the ground, and the flowchart is returned. On the other hand, when the determination result of Step S5 is NO, the process proceeds to Step S6, where the off-ground determination is performed for the right wheel 5R.

That is, it is determined whether or not the actual angular acceleration of the right wheel 5R is equal to or greater than the estimated angular acceleration of the right wheel 5R calculated in Step S4. If this determination result is YES, the process proceeds to Step S8, where it is determined that the right wheel 5R is off the ground, and the flowchart is returned. On the other hand, if the determination result of Step S6 is NO, the process proceeds to Step S9, where it is determined that both of the left and right wheels 5 are on the ground, and the flowchart is returned.

3. Actions and Effects (1) In the control device 10 described above, the estimated angular accelerations serving as the thresholds to be used for the off-ground determination are calculated based on the required torque values $T_{Lds}$ and $T_{Rds}$ and the equivalent moments of inertia $I_{Lds}$ and $I_{Rds}$ of the axles 4. Accordingly, the determination thresholds can be appropriately set at any time based on the driving state of the vehicle 1, so that the off-ground state of the left and right wheels 5 can be accurately determined.

(2) In the case of the vehicle 1 equipped with the power distribution mechanism 3 as illustrated in FIG. 2, the estimated angular accelerations are calculated using the reduction ratio G and the torque difference amplification factor of the power distribution mechanism 3, and thus, the determination thresholds can be appropriately set, enhancing the accuracy of the off-ground determination.

(3) Further, since the equivalent moments of inertia $I_{Lds}$ and $I_{Rds}$ are calculated based on the inertia $I_m$ of the two electric motors 2, the inertia $I_t$ of the left and right wheels 5, and the ratio of the angular accelerations of the left and right wheels 5, the determination thresholds can be set in accordance with the rate of change of the rotational angular speeds of the left and right wheels 5, enhancing the accuracy of the off-ground determination.

4. Miscellaneous

The vehicle 1 and the control device 10 described above are merely examples, and should not be limited to those described above. For example, the configuration of the power distribution mechanism 3 is not limited to the one illustrated in FIG. 2, and planetary gear mechanisms of various configurations and/or mechanisms other than planetary gear mechanisms may be adopted. Although the vehicle 1 described above exemplarily includes the power distribution mechanism 3 illustrated in FIG. 2, the power distribution mechanism 3 is not essential, and the control device 10 described above may be applied to, for example, a vehicle that includes in-wheel motors as drive sources. Even in this case, as in the embodiment described above, the off-ground determination can be performed by comparing the estimated angular accelerations with the actual angular accelerations.

REFERENCE SIGNS LIST

1 Vehicle
2 Electric motor
2L Left electric motor
2R Right electric motor
3 Power distribution mechanism
3g Reduction mechanism
4 Axle
4L Left axle
4R Right axle
5 Wheel
5L Left wheel
5R Right wheel
10 Controller (ECU)
11 First calculation unit
12 Second calculation unit
13 Third calculation unit
14 Determination unit
26,26L,26R Wheel speed sensor

The invention claimed is:

1. A control device for a vehicle equipped with two electric motors for driving left and right wheels of the vehicle, the control device comprising:
   a first calculation unit that calculates a required torque value of each of left and right axles of the vehicle;
   a second calculation unit that calculates an equivalent moment of inertia of each of the left and right axles;
   a third calculation unit that calculates an estimated angular acceleration of each of the left and right wheels based on the two required torque values calculated by the first calculation unit and the two equivalent moments of inertia calculated by the second calculation unit; and
   a determination unit that compares actual angular accelerations of the left and right wheels with the estimated angular accelerations calculated by the third calculation unit to perform off-ground determination for each of the left and right wheels.

2. The control device according to claim 1, wherein:
   the vehicle is further equipped with a power distribution mechanism that includes a reduction mechanism for reducing rotational speeds of the two electric motors and that distributes torque to each of the left and right wheels while amplifying a torque difference between the two electric motors; and
   the third calculation unit uses, when calculating the estimated angular accelerations, a reduction ratio and a torque difference amplification factor of the power distribution mechanism.

3. The control device according to claim 2, wherein each of the equivalent moments of inertia is calculated based on inertia of the two electric motors, inertia of the left and right wheels, and a ratio of angular accelerations of the left and right wheels.

* * * * *